US012807258B2

(12) United States Patent
Ishii

(10) Patent No.: US 12,807,258 B2
(45) Date of Patent: Nov. 24, 2026

(54) FRONT COWL

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 319 days.

(21) Appl. No.: 18/607,001

(22) Filed: Mar. 15, 2024

(65) Prior Publication Data

US 2024/0317346 A1 Sep. 26, 2024

(30) Foreign Application Priority Data

Mar. 20, 2023 (JP) ................................ 2023-043818

(51) Int. Cl.
*B62J 17/10* (2020.01)
*B62J 17/02* (2006.01)

(52) U.S. Cl.
CPC ............... *B62J 17/10* (2020.02); *B62J 17/02* (2013.01)

(58) Field of Classification Search
CPC ... B62J 7/10; B62J 17/02; B62J 6/026; F02M 35/10216; F02M 35/10006; F02M 35/10019
USPC ........................................................ 180/68.3
See application file for complete search history.

(56) References Cited

U.S. PATENT DOCUMENTS

| | | | | |
|---|---|---|---|---|
| 9,664,156 B2 * | 5/2017 | Tanaka | F02M 35/10019 | |
| 2014/0123942 A1 * | 5/2014 | Tanaka | F02M 35/10216 | 123/403 |
| 2016/0090144 A1 * | 3/2016 | Shimizu | B62J 17/02 | 296/180.1 |
| 2016/0097356 A1 * | 4/2016 | Tanaka | F02M 35/10006 | 123/58.1 |
| 2022/0126943 A1 * | 4/2022 | Yamamoto | B62J 17/10 | |

FOREIGN PATENT DOCUMENTS

| | | | | |
|---|---|---|---|---|
| EP | 3418168 A1 * | 12/2018 | B62J 17/02 |
| JP | 6011319 B2 | 9/2016 | |
| JP | 6806747 B2 | 1/2021 | |
| JP | 2022-069340 A | 5/2022 | |

OTHER PUBLICATIONS

Extended European Search Report mailed Jul. 29, 2024, issued to European Application No. 24164033.3.

* cited by examiner

*Primary Examiner* — James A Shriver, II
*Assistant Examiner* — Hilary L Johns
(74) *Attorney, Agent, or Firm* — Stein IP, LLC

(57) ABSTRACT

A front cowl covers a front portion of a vehicle provided with a headlight. The front cowl including: an intake port that takes in traveling wind from a front side of the vehicle; and a wind guide passage that allows the traveling wind to flow from the intake port toward a rear side of the vehicle. A bottom surface of the wind guide passage is inclined to be higher from the intake port toward the rear side of the vehicle, and the traveling wind is guided outward in a vehicle width direction from the intake port toward the rear side of the vehicle.

8 Claims, 8 Drawing Sheets

FRONT COWL

CROSS-REFERENCE TO RELATED APPLICATIONS

The disclosure of Japanese Patent Application No. 2023-043818 filed on Mar. 20, 2023, including specification, drawings and claims is incorporated herein by reference in its entirety.

TECHNICAL FIELD

The present invention relates to a front cowl.

BACKGROUND ART

A straddle-type vehicle provided with a front cowl for covering a front portion of the vehicle is known (for example, JP6011319B2). The front cowl described in JP6011319B2 has a streamline shape that slopes upward from a tip portion toward a rear side and widens in a vehicle width from the tip portion toward the rear side. Since unevenness on an outer surface of the front cowl is reduced, and traveling wind is allowed to flow smoothly toward the rear side of the vehicle body along the outer surface of the front cowl, air resistance is reduced. The outer surface of the front cowl receives the traveling wind, so that a down force is generated at the front portion of the vehicle and front lift can be prevented during traveling.

SUMMARY OF INVENTION

However, if an effect of air resistance is prioritized, the front cowl tends to be designed with fewer unevenness. On the other hand, if design is prioritized, there is a problem in that front lift cannot be prevented, especially when traveling at a high speed, and stability of the vehicle body is impaired.

The present invention has been made in view of the above, and an object of the present invention is to provide a front cowl that can generate a down force during traveling and improve traveling stability while improving design.

One aspect of the present embodiment is a front cowl that covers a front portion of a vehicle provided with a headlight. The front cowl includes an intake port that takes in traveling wind from a front side of the vehicle, and a wind guide passage that allows the traveling wind to flow from the intake port toward a rear side of the vehicle. A bottom surface of the wind guide passage is inclined to be higher from the intake port toward the rear side of the vehicle, and the traveling wind is guided outward in a vehicle width direction from the intake port toward the rear side of the vehicle.

According to the front cowl of one aspect of the present invention, even when the front cowl is provided with unevenness, the traveling wind taken in from the intake port is allowed to smoothly flow toward the rear side of the vehicle through the wind guide passage, so that air resistance is reduced. Since the traveling wind flows along the bottom surface of the wind guide passage, a down force is generated on the front cowl and front lift is reduced. Since the traveling wind flows outward in the vehicle width direction from the wind guide passage, the traveling wind is prevented from directly hitting a driver.

DESCRIPTION OF EMBODIMENTS

A front cowl of one aspect of the present invention covers a front portion of a vehicle provided with a headlight. The front cowl is formed with an intake port that takes in traveling wind from a front side of the vehicle, and a wind guide passage that allows the traveling wind to flow from the intake port toward a rear side of the vehicle. Even when the front cowl is provided with unevenness, the traveling wind taken in from the intake port is allowed to smoothly flow toward the rear side of the vehicle through the wind guide passage, so that air resistance is reduced. Since a bottom surface of the wind guide passage is inclined to be higher from the intake port toward the rear side of the vehicle, and the traveling wind flows along the bottom surface of the wind guide passage, a down force is generated on the front cowl and front lift is reduced. The traveling wind is guided outward in a vehicle width direction from the intake port toward the rear side of the vehicle, so that the traveling wind is prevented from directly hitting a driver.

Embodiment

Figure 1:
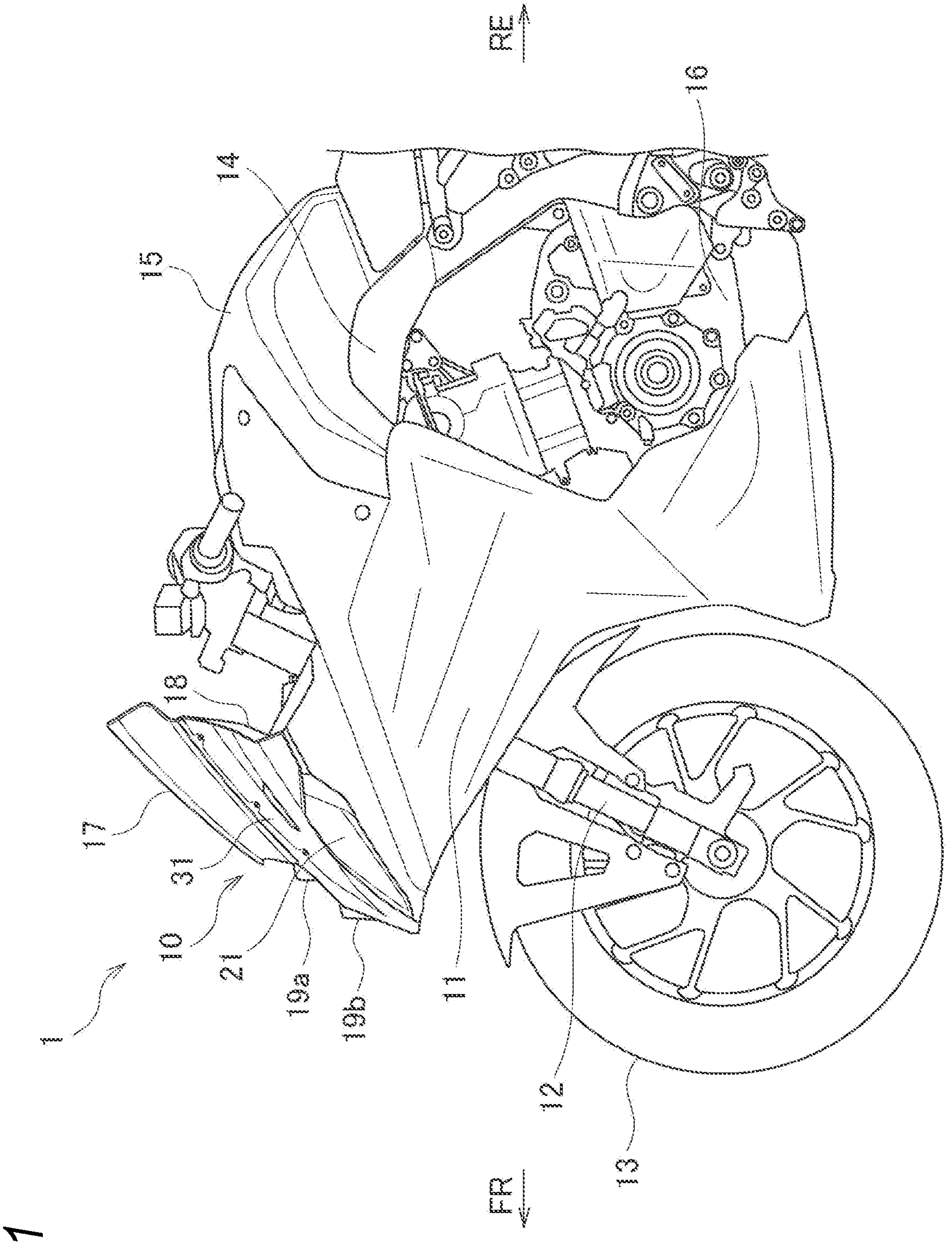
FIG. 1 is a side view of a front half of a straddle-type vehicle of one embodiment.

A straddle-type vehicle provided with a front cowl according to the present embodiment will be described below with reference to the accompanying drawings. FIG. 1 is a side view of a front half of a straddle-type vehicle of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a front cowl 10 and a pair of side cowls 11 are provided at a front portion of a straddle-type vehicle 1. The front cowl 10 covers the front portion of the vehicle from a front side, and the pair of side cowls 11 covers the front portion of the vehicle from lateral sides. A front fork 12 protrudes from the side cowls 11 toward a lower side, and a front wheel 13 is supported by a lower portion of the front fork 12 in a rotatable manner. A main frame 14 protrudes from the side cowls 11 toward a rear side, and a fuel tank 15 is provided above the main frame 14, and an engine 16 is provided below the main frame 14.

The front cowl 10 is inclined diagonally upward from a front end toward the rear side, and expands outward in a vehicle width direction from the front end toward the rear side. A wind screen 17 for wind protection is attached to an upper side of a front surface of the front cowl 10, and a meter cover 18 is attached to a rear side of the front cowl 10. Upper and lower headlights 19*a* and 19*b* provided at the front portion of the vehicle are provided inside the front cowl 10, and lenses of the headlights 19*a* and 19*b* are exposed from the front surface of the front cowl 10. The front cowl 10 has a double structure in which a front lower cowl 21 is covered with a front upper cowl 31.

Generally, an outer surface of the front cowl is formed into a streamline shape with fewer unevenness so that traveling wind can flow smoothly along the outer surface of the front cowl, and in this way, a degree of freedom in design of the front cowl is reduced. If the front cowl has a double structure design and is provided with unevenness, depending on how the traveling wind hits the front cowl, an upward force may be generated at the front portion of the vehicle, so that stability of a vehicle body may be impaired. Therefore, a wind guide passage is formed in the front cowl 10 of the present embodiment, thereby achieving both improved design from the double-structured cowl shape and improved traveling stability from a down force.

Figure 2:
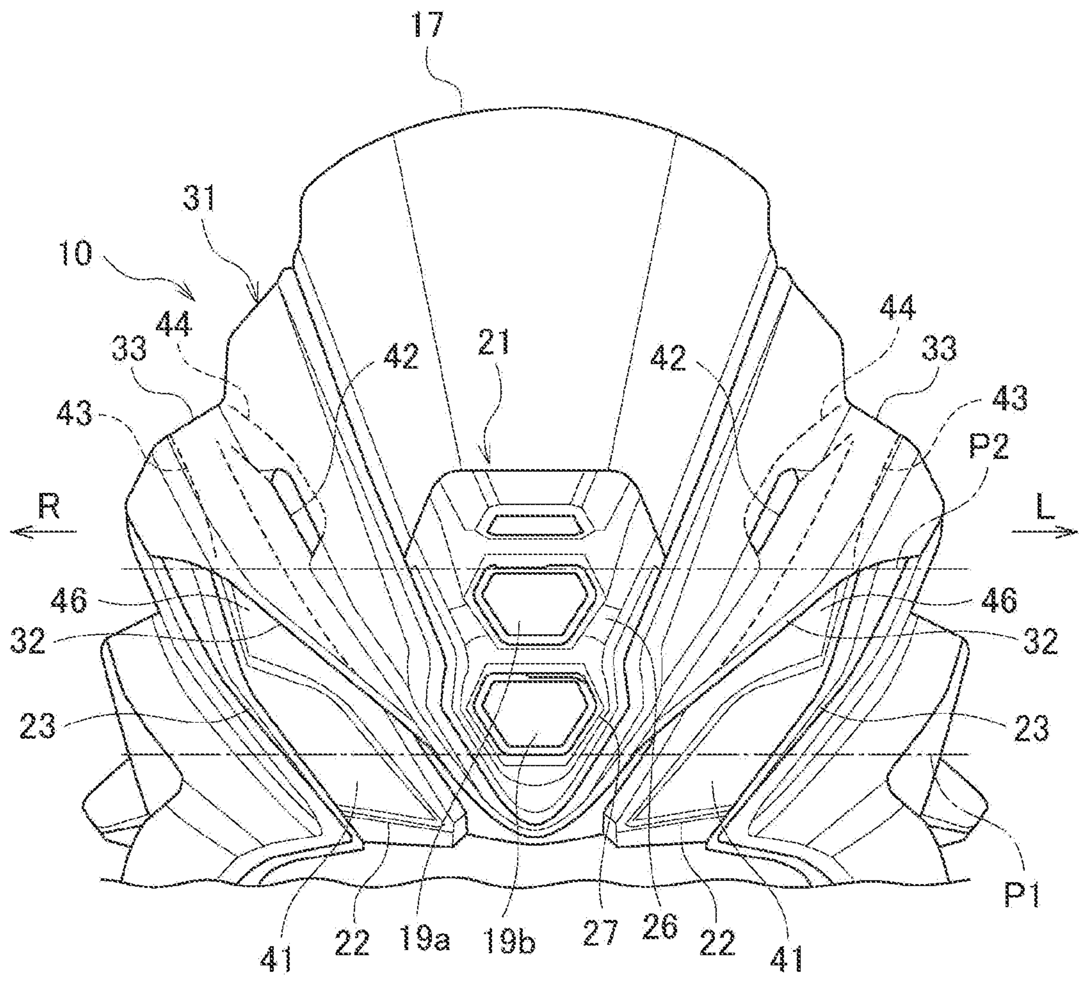
FIG. 2 is a front view of a front portion of the vehicle of the present embodiment.
Figure 3:
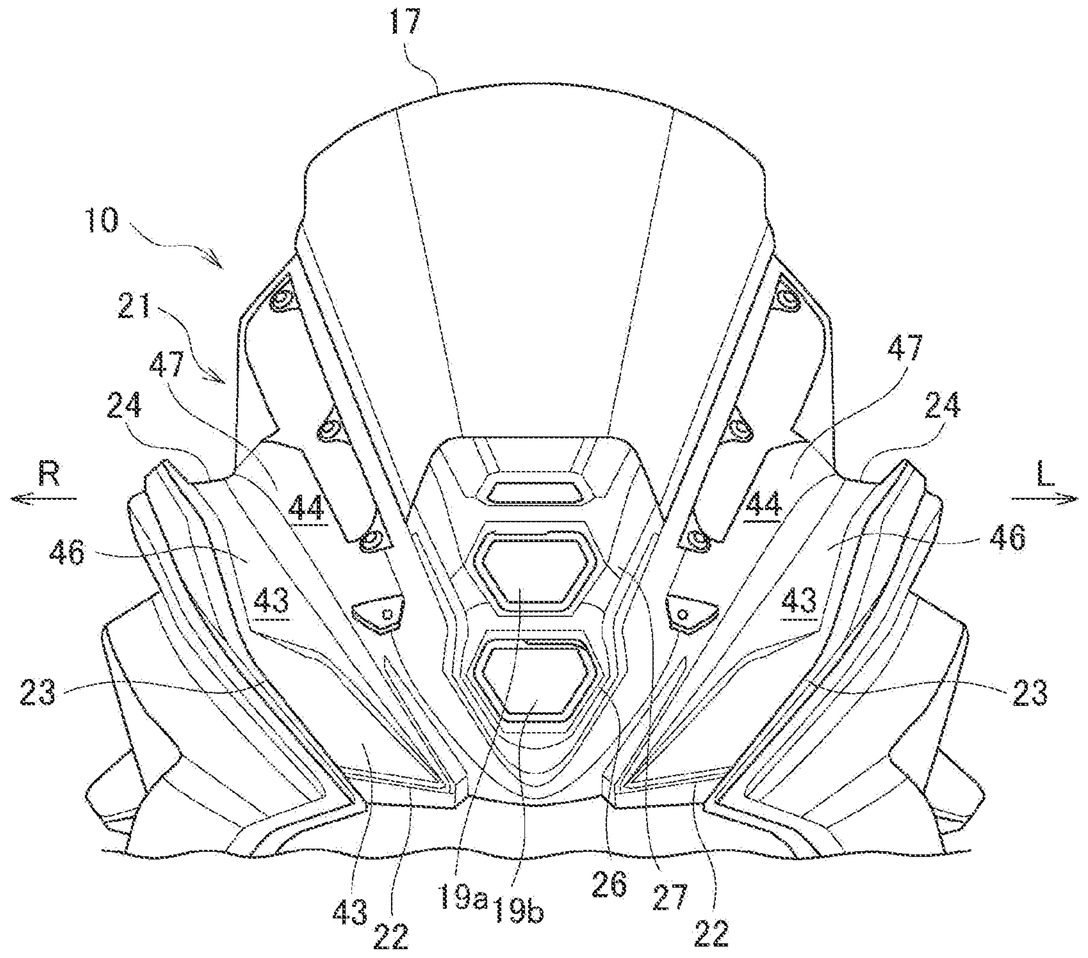
FIG. 3 is a front view of the front portion of the vehicle without a front upper cowl of the present embodiment.
Figure 4:
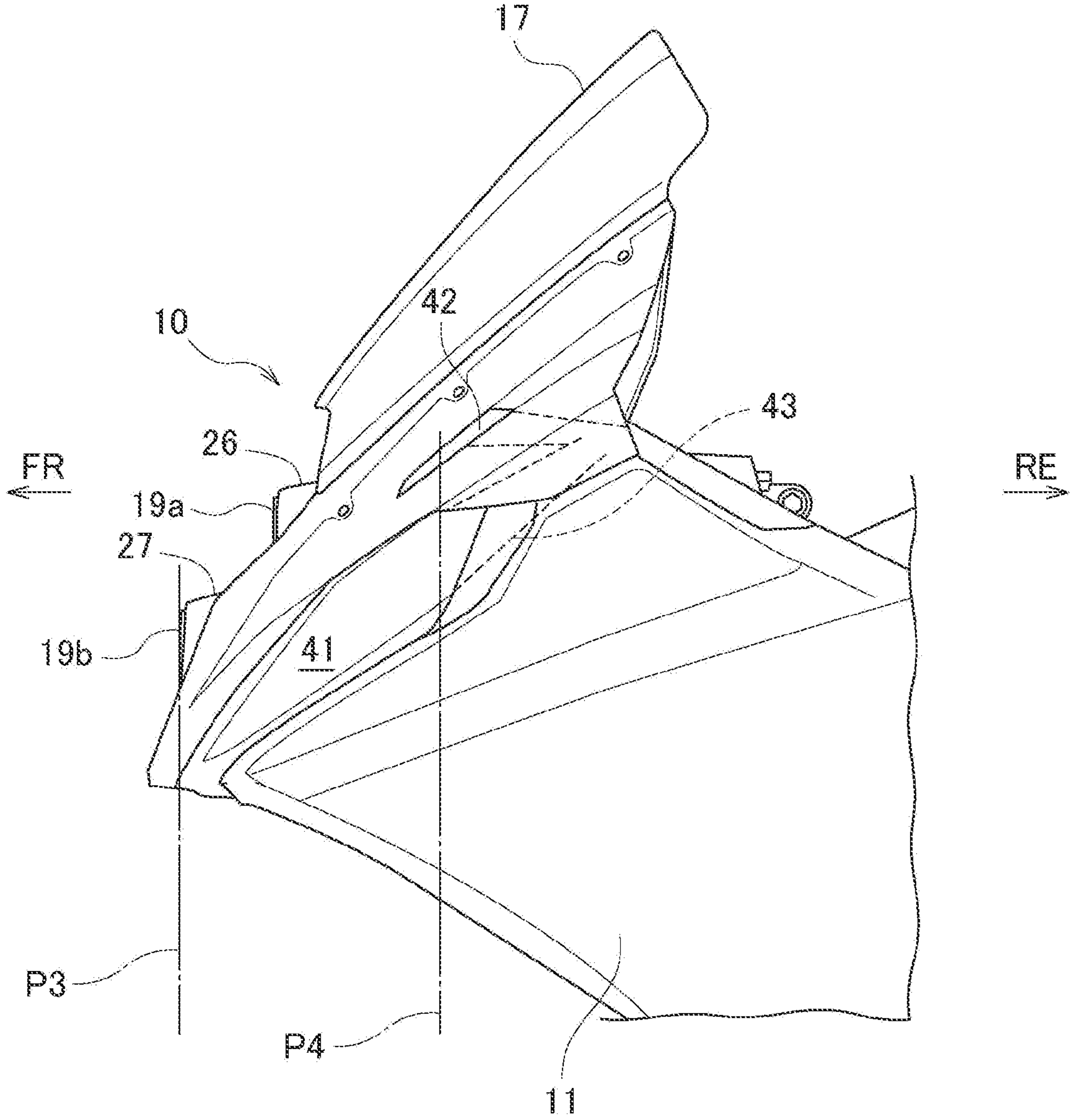
FIG. 4 is a side view of the front portion of the vehicle of the present embodiment.
Figure 5:
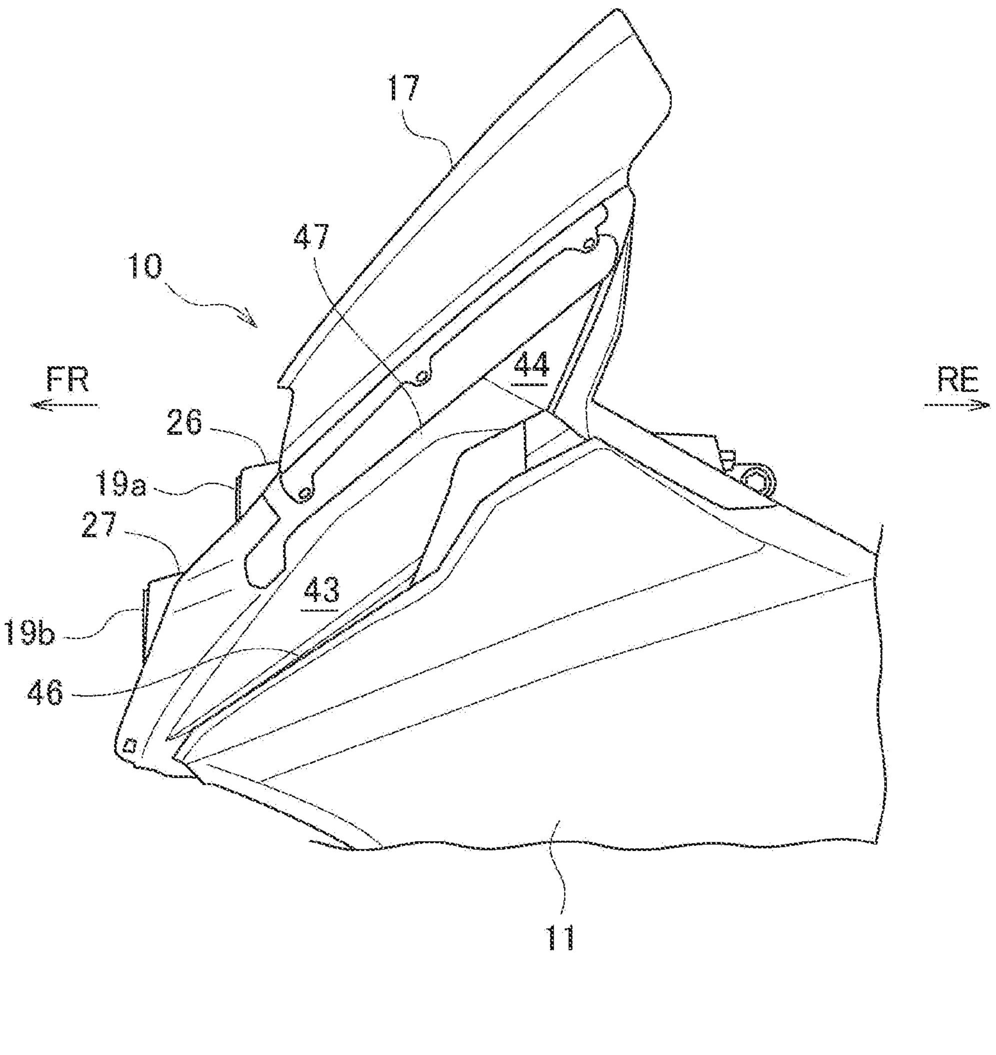
FIG. 5 is a side view of the front portion of the vehicle without the front upper cowl of the present embodiment.

The front cowl of the present embodiment will be described with reference to FIGS. 2 to 5. FIG. 2 is a front view of the front portion of the vehicle of the present embodiment. FIG. 3 is a front view of the front portion of the vehicle without the front upper cowl of the present embodiment. FIG. 4 is a side view of the front portion of the vehicle of the present embodiment. FIG. 5 is a side view of the front portion of the vehicle without the front upper cowl of the present embodiment.

As shown in FIGS. 2 and 3, the front portion of the vehicle where the headlights 19*a* and 19*b* are provided is covered by the front cowl 10. A base portion of the front cowl 10 is formed by the front lower cowl 21, and a cover portion of the front cowl 10 is formed by the front upper cowl 31. The lenses of the headlights 19*a* and 19*b* are arranged vertically in the front portion of the vehicle, and the front lower cowl 21 is provided at the front portion of the vehicle in a manner of surrounding these headlights 19*a* and 19*b*. The front lower cowl 21 is covered from above by the front upper cowl 31 on both lateral sides of the headlights 19*a* and 19*b*.

A center portion of the front lower cowl 21 is formed by two stages of an upper stage portion 26 and a lower stage portion 27. The lower stage portion 27 of the front lower cowl 21 protrudes further toward the front side of the vehicle than the upper stage portion 26 (see FIG. 4). The lens of the headlight 19*a* is exposed through an opening of the upper stage portion 26, and the lens of the headlight 19*b* is exposed through an opening of the lower stage portion 27. On both lateral sides of the headlights 19*a* and 19*b*, the front lower cowl 21 is covered with the front upper cowl 31 to form a double structure. First and second wind guide passages 43 and 44 are formed in the front cowl 10 by hollow structures of the front lower cowl 21 and the front upper cowl 31.

In a front view, a lower edge 32 of the front upper cowl 31 is inclined upward and outward in the vehicle width direction. In the front view, a lower edge 22 of the front lower cowl 21 widens in the vehicle width direction, and an outer edge 23 of the front lower cowl 21 is inclined upward and outward in the vehicle width direction. A lower end of the lower edge 32 of the front upper cowl 31 extends to the lower edge 22 side of the front lower cowl 21, and an upper end of the lower edge 32 of the front upper cowl 31 extends to the outer edge 23 side of the front lower cowl 21. The lower edge 32 of the front upper cowl 31 and the lower edge 22 and the outer edge 23 of the front lower cowl 21 form a first intake port (intake port) 41 that takes in traveling wind from the front side of the vehicle.

In the front view, an upper edge 33 of the front upper cowl 31 is inclined downward and outward in the vehicle width direction (see FIG. 2). An upper edge 24 of the front lower cowl 21 is formed in a concave shape in a front view (see FIG. 3). The upper edge 33 of the front upper cowl 31 and the upper edge 24 of the front lower cowl 21 form an exhaust port 45 (see FIG. 8) that exhausts the traveling wind toward the rear side of the vehicle. A first wind guide surface 46 is formed from the lower edge 22 to the upper edge 24 of the front lower cowl 21. A first wind guide passage (wind guide passage) 43 that allows the traveling wind to flow from the first intake port 41 toward the exhaust port 45 to the rear side of the vehicle is formed by the first wind guide surface 46 of the front lower cowl 21 and the front upper cowl 31.

The front upper cowl 31 in formed with a second intake port (the other intake port) 42 which is open at a portion above the first intake port 41 and which takes in the traveling wind from the front side of the vehicle. The second intake port 42 is formed in a shape of a long hole that is inclined upward and outward in the vehicle width direction. A second wind guide surface 47 is formed along the first wind guide surface 46, whose inner side in the vehicle width direction is higher than the first wind guide surface 46 of the front lower cowl 21 (see FIG. 3). A second wind guide passage (the other wind guide passage) 44 that allows the traveling wind to flow from the second intake port 42 toward the exhaust port 45 to the rear side of the vehicle is formed by the second wind guide surface 47 of the front cowl 10 and the front upper cowl 31.

The traveling wind taken in from the first intake port 41 smoothly flows to the rear side of the vehicle through the first wind guide passage 43, and the traveling wind taken in from the second intake port 42 smoothly flows to the rear side of the vehicle through the second wind guide passage 44, so that the air resistance of the front cowl 10 is reduced. In the front view, the second intake port 42 is formed smaller than the first intake port 41, and the outer edge of the second intake port 42 is positioned inside the outer edge of the first intake port 41 in the vehicle width direction. The second intake port 42 is formed in an empty space of the front upper cowl 31, and even when the second intake port 42 is formed in addition to the first intake port 41, upsizing of the front cowl 10 can be prevented.

A bottom surface of the first wind guide passage 43, that is, the first wind guide surface 46, is inclined to be higher from the first intake port 41 toward the rear side of the vehicle. Since the traveling wind flows along the first wind guide passage 43, a down force is generated on the front cowl 10 and front lift of the front portion of the vehicle is reduced. In a vicinity of the exhaust port 45, a downstream side of the first wind guide passage 43 and a downstream side of the second wind guide passage 44 are continuous. The traveling wind joins on the downstream side of the first wind guide passage 43 and the downstream side of the second wind guide passage 44, and a flow rate of the traveling wind in the first wind guide passage 43 is increased, so that the down force generated on the front cowl 10 is increased.

An upstream side of the first wind guide passage 43 is exposed from the first intake port 41, and the downstream side of the first wind guide passage 43 is covered with the front upper cowl 31 and formed into a tunnel shape. Inside the tunnel, a width of the first wind guide surface 46 becomes smaller (see especially FIG. 3), and the first wind guide passage 43 is narrowed from the first intake port 41 toward the rear side (upper side) of the vehicle. By constricting the first wind guide passage 43 toward the rear side of the vehicle, the flow rate of the traveling wind is increased, and the down force is further increased. Since the flow rate of the traveling wind increases regardless of the shape of the first intake port 41, the degree of freedom in designing the first intake port 41 can be improved.

Figure 8:
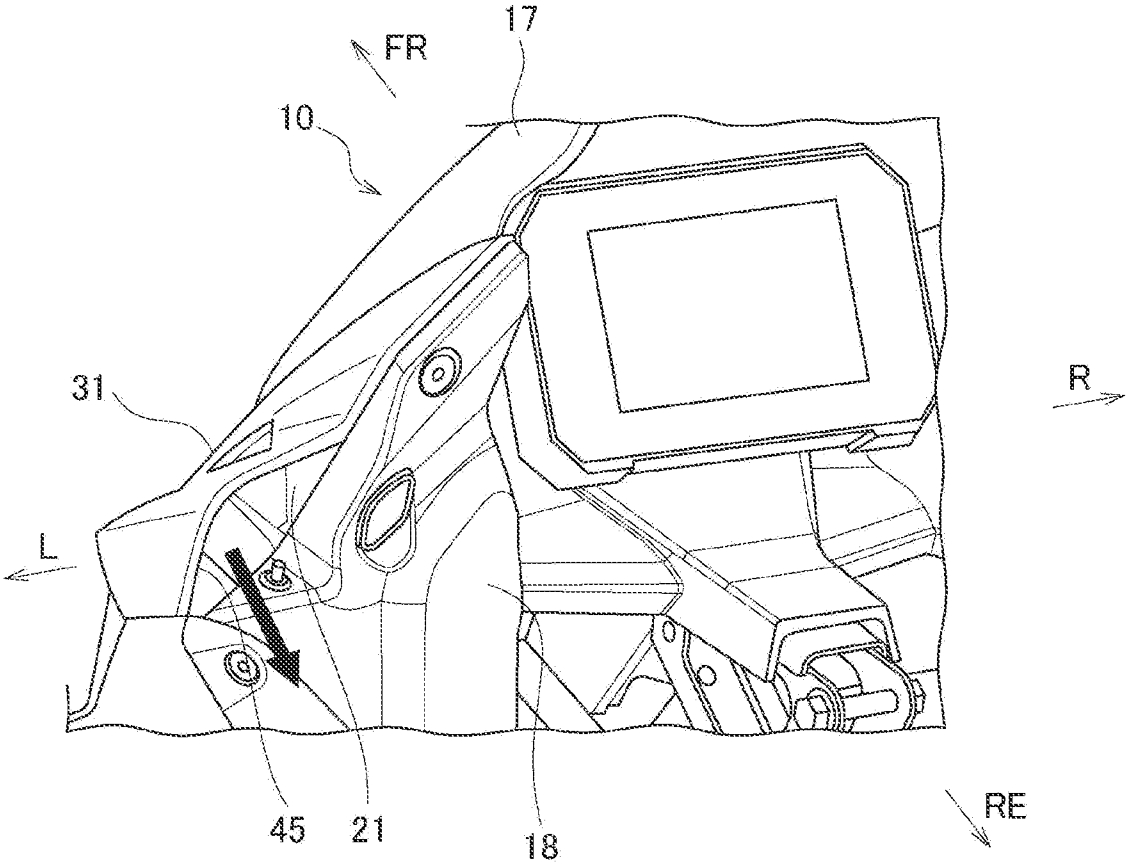
FIG. 8 is a perspective view of the front portion of the vehicle of the present embodiment as viewed diagonally from a rear side.

In the front view, the first and second intake ports 41 and 42 are positioned on the lateral sides of the headlights 19*a* and 19*b*, and the exhaust port 45 is positioned on a lateral side of the meter cover 18 (see FIG. 8). The exhaust port 45 is positioned outside the first and second intake ports 41 and 42 in the vehicle width direction, and the first and second wind guide passages 43 and 44 extend outward in the vehicle width direction from the first and second intake ports 41 and 42 toward the exhaust port 45. The first and second wind guide passages 43 and 44 guide the traveling wind outward in the vehicle width direction from the first and second intake ports 41 and 42 toward the rear side of the vehicle. The traveling wind is blown out altogether from the exhaust port 45, so that the traveling wind is less likely to hit the driver directly, and wind protection is improved.

In the front view, a lower end of the first intake port 41 is positioned below a lower end P1 of the lens of the headlight 19*b*, and an upper end of the first intake port 41 is approximately positioned at the same height as an upper end P2 of the lens of the headlight 19*a*. Therefore, a height dimension of the first intake port 41 is formed larger than a height dimension of the lenses of the headlights 19*a* and 19*b*, and an area occupied by the first intake port 41 on the front surface of the front cowl 10 becomes larger. The flow rate of the traveling wind taken from the first intake port 41 into the first wind guide passage 43 increases, and the down force becomes larger. The first intake port 41 forms unevenness on the front surface of the front cowl 10, thereby improving design.

As shown in FIGS. 4 and 5, in a side view, the front end of the first intake port 41 is at approximately the same position as a front end P3 of the headlight 19*b*, and a rear end of the first intake port 41 is positioned further rearward of the vehicle than a rear end P4 of the headlight 19*a*. Therefore, a front-rear dimension of the first intake port 41 is formed larger than a front-rear dimension of the headlights 19*a* and 19*b*, and the flow rate of the traveling wind taken from the first intake port 41 into the first wind guide passage 43 is increased, so that the down force is increased. The first wind guide passage 43 is formed in a tunnel shape behind the headlights 19*a* and 19*b*, and a wind exhaust direction is controlled by the tunnel-shaped first wind guide passage 43.

In the side view, the front end of the second intake port 42 is positioned further rearward than the front end of the first intake port 41, and the lower end of the second intake port 42 is positioned above the upper end of the first intake port 41. The first intake port 41 with a large opening area is provided near the front side of the front cowl 10 where air resistance is relatively large, and the second intake port 42 with a small opening area is provided near the rear side of the front cowl 10 where air resistance is relatively small. Therefore, the air resistance on the front and lower side of the front cowl 10 is effectively reduced by the first intake port 41, and the air resistance on the rear and upper side of the front cowl 10 is effectively reduced by the second intake port 42.

Figure 6:
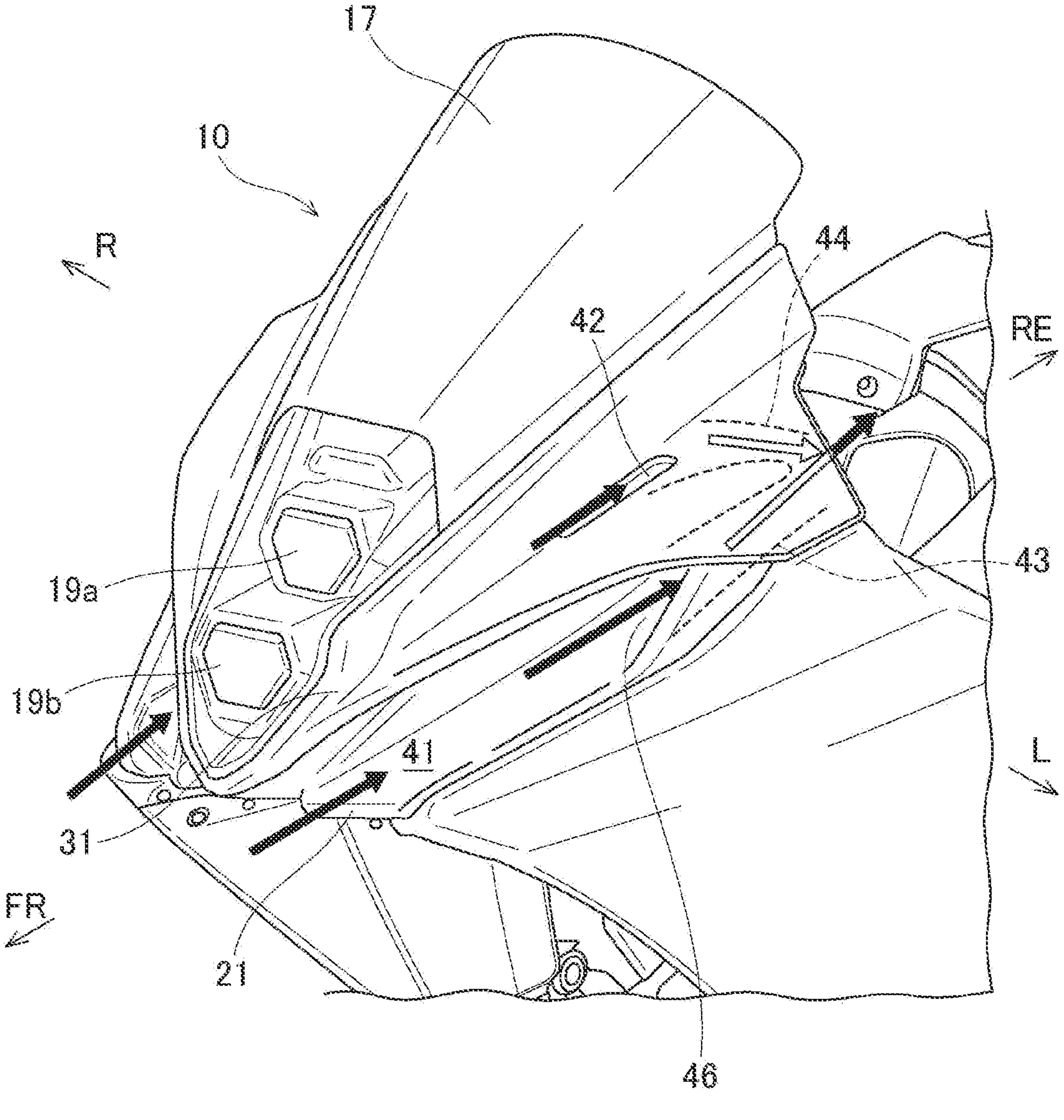
FIG. 6 is a perspective view of the front portion of the vehicle of the present embodiment as viewed diagonally from a front side.
Figure 7:
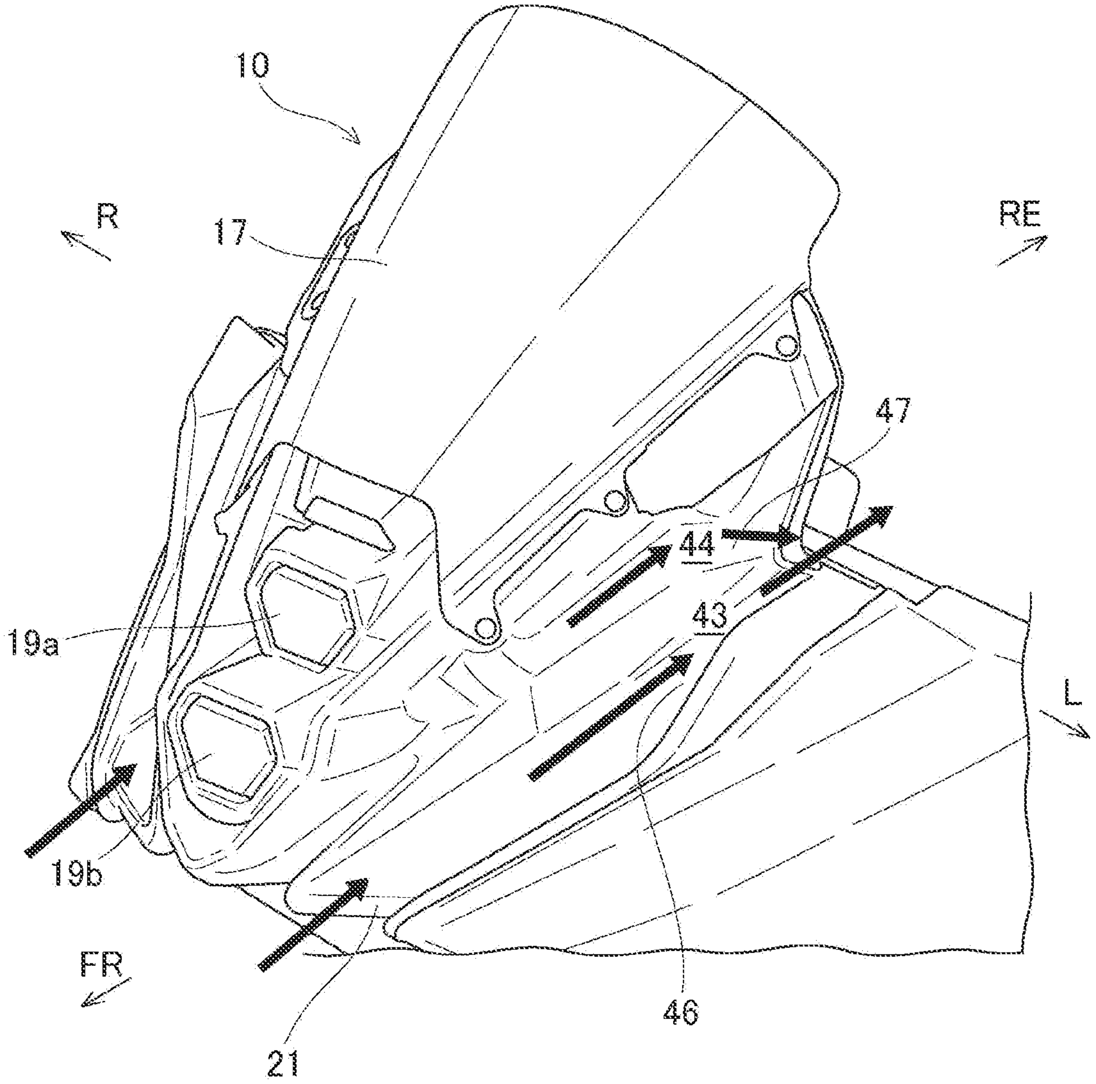
FIG. 7 is a perspective view of the front portion of the vehicle without the front upper cowl of the present embodiment as viewed diagonally from the front side.

With reference to FIGS. 6 to 8, flow of the traveling wind around the front cowl of the present embodiment will be described. FIG. 6 is a perspective view of the front portion of the vehicle of the present embodiment as viewed diagonally from the front side. FIG. 7 is a perspective view of the front portion of the vehicle without the front upper cowl of the present embodiment as viewed diagonally from the front side. FIG. 8 is a perspective view of the front portion of the vehicle of the present embodiment as viewed diagonally from the rear side.

As shown in FIGS. 6 and 7, when the vehicle is traveling, the traveling wind flows along the front surface of the front cowl 10, and a part of the traveling wind flows from the first and second intake ports 41 and 42 into the first and second wind guide passages 43 and 44. The traveling wind flowing along a lower side of the front surface of the front cowl 10 is taken into the first intake port 41, and the traveling wind flowing along an upper side of the front surface of the front cowl 10 is taken into the second intake port 42. Although the front upper cowl 31 is stacked on the front lower cowl 21 and unevenness is provided on the front surface of the front cowl 10, the traveling wind flows into the first and second intake ports 41 and 42 and escapes to the rear side of the vehicle, so that the air resistance of the front cowl 10 is reduced.

The first wind guide surface 46 of the first wind guide passage 43 becomes higher toward the rear side, and a passage width of the first wind guide passage 43 is narrowed toward the exhaust port 45. The traveling wind flows along the first wind guide surface 46, and the flow rate of the traveling wind increases toward the exhaust port 45, so that a down force is generated on the front cowl 10. Furthermore, the downstream side of the second wind guide surface 47 of the second wind guide passage 44 is brought closer to the downstream side of the first wind guide surface 46, and the first wind guide passage 43 and the second wind guide passage 44 are continuous in the vicinity of the exhaust port 45 (see FIG. 8). Since the traveling wind in the first wind guide passage 43 joins the traveling wind in the second wind guide passage 44, the flow rate of the traveling wind in the first wind guide passage 43 is increased, and the down force is increased.

As shown in FIG. 8, the front lower cowl 21 is covered with the front upper cowl 31, and the downstream side of the first wind guide passage 43 is formed into a tunnel shape, and the second wind guide passage 44 is connected to the inside of the tunnel portion of the first wind guide passage 43. The first and second wind guide passages 43 and 44 extend outward in the vehicle width direction toward the exhaust port 45, and the exhaust port 45 is positioned outside the meter cover 18 in the vehicle width direction. Therefore, a blowing direction of the traveling wind from the exhaust port 45 is controlled so that the traveling wind is blown out from the exhaust port 45 diagonally outward in the vehicle width direction to the rear side, and the traveling wind blown out from the exhaust port 45 is less likely to hit the driver directly.

As described above, according to the front cowl 10 of the present embodiment, even when the front cowl 10 is provided with unevenness, the traveling wind taken in from the first and second intake ports 41 and 42 is allowed to smoothly flow toward the rear side of the vehicle through the first and second wind guide passages 43 and 44, so that the air resistance is reduced. Since the traveling wind flows along the bottom surfaces of the first and second wind guide passages 43 and 44, a down force is generated on the front cowl 10 and front lift is reduced. Since the traveling wind flows outward in the vehicle width direction from the first and second wind guide passages 43 and 44, the traveling wind is prevented from directly hitting the driver.

Note that in the present embodiment, the first and second intake ports are formed in the front cowl, but it is sufficient that the front cowl has at least one intake port formed therein.

In the present embodiment, the front cowl is formed by covering the front lower cowl with the front upper cowl, but the front cowl may be formed of a single member.

In the present embodiment, the height dimension of the first intake port is formed larger than the height dimension of the lenses of the headlights, and the front-rear dimension of the first intake port is formed larger than the front-rear dimension of the headlights, but the height dimension and the front-rear dimension of the first intake port are not particularly limited.

In the present embodiment, the downstream side of the first wind guide passage and the downstream side of the second wind guide passage are continuous, but the downstream side of the first wind guide passage and the downstream side of the second wind guide passage may be not continuous.

The front cowl of each embodiment is not limited to being adopted in the above-mentioned straddle-type vehicle, but may be adopted in other types of straddle-type vehicles. Note that the straddle-type vehicle is not limited to a general vehicle in which a driver rides on a seat in a posture of straddling the seat, and includes a scooter-type vehicle in which the driver rides on the seat without straddling the seat.

As described above, a first aspect is a front cowl (10) that covers a front portion of a vehicle provided with a headlight (19*a*, 19*b*), the front cowl including: an intake port (first intake port 41) that takes in traveling wind from a front side of the vehicle; and a wind guide passage (first wind guide passage 43) that allows the traveling wind to flow from the intake port toward a rear side of the vehicle, in which a bottom surface (first wind guide surface 46) of the wind guide passage is inclined to be higher from the intake port toward the rear side of the vehicle, and the traveling wind is guided outward in a vehicle width direction from the intake port toward the rear side of the vehicle. According to this configuration, even when the front cowl is provided with unevenness, the traveling wind taken in from the intake port is allowed to smoothly flow toward the rear side of the vehicle through the wind guide passage, so that the air resistance is reduced. Since the traveling wind flows along the bottom surface of the wind guide passage, a down force is generated on the front cowl and front lift is reduced. Since the traveling wind flows outward in the vehicle width direction from the wind guide passage, the traveling wind is prevented from directly hitting the driver.

In the first aspect, a second aspect is that the wind guide passage is formed narrower from the intake port toward the rear side of the vehicle. According to this configuration, by narrowing the wind guide passage toward the rear side of the vehicle, the flow rate of the traveling wind is increased, and the down force is increased, so that front lift is reduced. Since the flow rate of the traveling wind is increased regardless of the shape of the intake port, the degree of freedom in designing the intake port can be improved.

In the first aspect or the second aspect, a third aspect is that the intake port is positioned on a lateral side of the headlight in a front view, and a height dimension of the intake port is larger than a height dimension of a lens of the headlight. According to this configuration, by increasing the opening area of the intake port, the flow rate of the traveling wind taken from the intake port into the wind guide passage increases, and the down force increases, so that the front lift is further reduced. Since the intake port is positioned on the lateral side of the headlight, the design does not deteriorate.

In any one of the first to third aspects, a fourth aspect is that the intake port is positioned on a lateral side of the headlight in a front view, a front-rear dimension of the intake port is larger than a front-rear dimension of the headlight, and the wind guide passage is formed in a tunnel shape behind the headlight in a side view. According to this configuration, by increasing the opening area of the intake port, the flow rate of the traveling wind taken from the intake port into the wind guide passage increases, and the down force increases, so that the front lift is reduced. Since the intake port is positioned on the lateral side of the headlight, the design does not deteriorate. Furthermore, by forming the downstream side of the wind guide passage into a tunnel shape, the wind exhaust direction can be controlled.

In any one of the first to fourth aspects, a fifth aspect further includes: the other intake port (second intake port 42) that takes in the traveling wind from the front side of the vehicle; and the other wind guide passage (second wind guide passage 44) that allows the traveling wind to flow from the other intake port toward the rear side of the vehicle, in which the other intake port is smaller than the intake port in a front view. According to this configuration, the traveling wind taken in from the intake port smoothly flows to the rear side of the vehicle through the wind guide passage, and the traveling wind taken in from the other intake port smoothly flows to the rear side of the vehicle through the other wind guide passage, so that the air resistance of the front cowl is reduced. By forming the other intake port smaller than the intake port, it is possible to prevent the front cowl from increasing in size.

In the fifth aspect, a sixth aspect is that a front edge of the other intake port is positioned behind a front edge of the intake port in a side view. According to this configuration, the intake port with a large opening area is formed near the front side of the front cowl where air resistance is relatively large, and the other intake port with a small opening area is formed near the rear side of the front cowl where air resistance is relatively small. Therefore, the air resistance of the front cowl is effectively reduced by the intake port and the other intake port.

In the fifth aspect or the sixth aspect, a seventh aspect is that an outer edge of the other intake port is positioned further inward in the vehicle width direction than an outer edge of the intake port in the front view. According to this configuration, even when the other intake port is formed in the front cowl in addition to the intake port, the front cowl can be prevented from increasing in size.

In any one of the fifth to seventh aspects, an eighth aspect is that a downstream side of the other wind guide passage and a downstream side of the wind guide passage are continuous. According to this configuration, the traveling wind joins on the downstream side of the wind guide passage and the downstream side of the other wind guide passage, and the flow rate of the traveling wind in the wind guide passage is increased, so that the down force generated on the front cowl is increased, and the front lift is further reduced. The traveling wind from the wind guide passage and the other wind guide passages are blown out altogether, and the traveling wind is prevented from directly hitting the driver.

In any one of the first to eighth aspects, a ninth aspect further includes: a front lower cowl (21) that surrounds the headlight; and a front upper cowl (31) that covers the front lower cowl from above, in which the intake port and the wind guide passage are formed by the front lower cowl and the front upper cowl. According to this configuration, the intake port and the wind guide passage can be easily formed by the hollow shape between the front lower cowl and the front upper cowl.

Although the present embodiment has been described, as another embodiment, the above-described embodiment and modification may be combined entirely or partially.

The technique according to the present invention is not limited to the above-described embodiment, and may be variously changed, replaced, or modified without departing from the gist of the technical concept. Further, the present invention may be implemented by other methods as long as the technical concept can be implemented by the methods through advance of the technique or other derivative techniques. Therefore, the claims cover all embodiments that may fall within the scope of the technical concept.

What is claimed is:

1. A front cowl that covers a front portion of a vehicle provided with a headlight, the front cowl comprising:

an intake port that takes in traveling wind from a front side of the vehicle;

a wind guide passage that allows the traveling wind to flow from the intake port toward a rear side of the vehicle;

a front lower cowl that surrounds the headlight; and a front upper cowl that covers the front lower cowl from above, wherein a bottom surface of the wind guide passage is inclined to be higher from the intake port toward the rear side of the vehicle, and the traveling wind is guided outward in a vehicle width direction from the intake port toward the rear side of the vehicle, and the intake port and the wind guide passage are formed by the front lower cowl and the front upper cowl.

2. The front cowl according to claim 1, wherein the wind guide passage is formed narrower from the intake port toward the rear side of the vehicle.

3. The front cowl according to claim 1, wherein the intake port is positioned on a lateral side of the headlight in a front view, and a height dimension of the intake port is larger than a height dimension of a lens of the headlight.

4. The front cowl according to claim 1, wherein the intake port is positioned on a lateral side of the headlight in a front view, a front-rear dimension of the intake port is larger than a front-rear dimension of the headlight, and the wind guide passage is formed in a tunnel shape behind the headlight in a side view.

5. The front cowl according to claim 1, further comprising:

the other intake port that takes in the traveling wind from the front side of the vehicle; and the other wind guide passage that allows the traveling wind to flow from the other intake port toward the rear side of the vehicle, wherein the other intake port is smaller than the intake port in a front view.

6. The front cowl according to claim 5, wherein a front edge of the other intake port is positioned behind a front edge of the intake port in a side view.

7. The front cowl according to claim 5, wherein an outer edge of the other intake port is positioned further inward in the vehicle width direction than an outer edge of the intake port in the front view.

8. The front cowl according to claim 5, wherein a downstream side of the other wind guide passage and a downstream side of the wind guide passage are continuous.

* * * * *